Sept. 24, 1968    P. P. BERTHIAUME ET AL    3,402,594
VOLUME MEASURING DEVICE

Filed Sept. 21, 1966    7 Sheets-Sheet 1

INVENTORS
Pierre P. BERTHIAUME
William BOWLER
Raymond E. KALITA

Fetherstonhaugh & Co.
ATTORNEYS

Sept. 24, 1968   P. P. BERTHIAUME ET AL   3,402,594
VOLUME MEASURING DEVICE

Filed Sept. 21, 1966                    7 Sheets-Sheet 6

*INVENTORS*
Pierre P. BERTHIAUME
William BOWLER
Raymond E. KALITA

*ATTORNEYS*

Sept. 24, 1968  P. P. BERTHIAUME ET AL  3,402,594
VOLUME MEASURING DEVICE
Filed Sept. 21, 1966  7 Sheets-Sheet 7

INVENTORS
Pierre P. BERTHIAUME
William BOWLER
Raymond E. KALITA

ATTORNEYS

United States Patent Office 3,402,594
Patented Sept. 24, 1968

3,402,594
VOLUME MEASURING DEVICE
Pierre P. Berthiaume, 3440 Toupin, St. Laurent, Quebec, Canada; William Bowler, 4371 Acadie, Pierrefonds, Quebec, Canada; and Raymond E. Kalita, 5340 Dudemaine, Apt. 22, Montreal, Quebec, Canada
Filed Sept. 21, 1966, Ser. No. 580,967
10 Claims. (Cl. 73—32)

This invention relates to a new and improved apparatus for measuring the volumes of packages. Such apparatus may be in hand-held form, wherein the operator will move the apparatus from package to package, or the apparatus may be fixed to a table or other suitable structure and the packages brought to the apparatus for volumetric measurement thereof.

In the field of freight transportation it has long been the practice for carriers to make charges proportional to the weight of the freight carried. However, in the case of freight transportation by rail, for example, it is possible to have a freight car filled with lightweight packages which do not amount to a revenue which is economically practical. In such cases it becomes more economical to charge on a cost per unit volume basis.

It is, therefore, the main object of this invention to provide a new and improved apparatus whereby the volume of a package can be quickly and simply estimated, without involving the use of measuring equipment, or by the operator having to perform any calculations.

Another object is to provide an apparatus as set forth in the main objective, whereby, with the addition of a numerical factor in the means for reading the volumetric output, a direct reading of rate may be obtained.

A further object is to provide an apparatus as set forth in the main object whereby, with the addition of load cells or manual weighing means together with other components, a direct reading of density may be obtained.

In its basic form, either hand-held or fixed, the device comprises a spool around which a specific length of line, having a probe at the outer end thereof, is wound in side-by-side coils. An example of such a line is a steel stranded nylon fishing type line. The spool is rotatably mounted on a mounting bracket and incorporates a spring arrangement for returning the spool to the fully wound position, when the line has been extended and then released. A rotary electrical potentiometer is also operatively mounted on a mounting bracket and is coupled to the spool so that rotation of the spool will cause rotation of the rotary potentiometer. The coupling of the spool to the potentiometer may be direct axial coupling or indirect coupling through spur or bevel gearing, wherein the potentiometer may be mounted axially parallel with the axis of the spool, or at an angle to the spool. Thus, when the line is extended the potentiometer will be rotated, and the length of the line and coupling ratio is arranged so that maximum extension provides maximum rotation of the potentiometer, e.g., 50 inch line extension may provide 10 revolutions of the potentiometer.

The potentiometer is electrically connected to apparatus designed to compute the volume of a package when provided with three linear measurements obtained by extending the line and probe along the width, depth and height of the package. The linear measurements are converted into three separate electrical outputs, of corresponding value, by means of the potentiometer. To make a volume measurement the device is positioned adjacent a vertical edge of a package and the line extended across the width. This rotates the potentiometer an amount proportional to the line extension and an electrical output is produced, also proportional to the line extension, the electrical output being noted by pressing a suitable button. This is repeated for the other two dimensions required for cubic measurement. As each electrical output is noted, it is individually stored in a capacitor. Two computing methods can now be used to find the volume.

Using a natural logarithmic potentiometer the three voltages may be fed simultaneously into the summing junction of an operational amplifier, which sums the three voltages. Another method is to connect the three storage capacitors in series to provide the required addition. The antilog of the amplifier output voltage will represent the required volume measurement, which can be displayed on a meter or suitably printed out.

Using a linear potentiometer the three voltages may be fed into multiplier units and amplifiers, to obtain a voltage directly proportional to the volume. Another method is to effect an overall multiplication by potentiometer scaling, whereby, the output from a previous measurement is used as the input for a subsequent measurement. Again the output can be displayed on a meter or suitably printed out.

Either of these two methods can be used to compute package rate by the addition of a numerical factor in the output.

Apparent density can also be computed by the incorporation of an electronic weighing scale into the apparatus. The weight of the package, expressed as an electrical signal, will be divided by the package volume, and the resulting output will then represent the apparent density.

These and other objects and advantages of this invention will be further apparent by referring to the following detailed specification, and figures in which.

Referring to FIGS. 1 to 8 the illustrated hand-held device comprises a spool 20 which is mounted on shaft 22. Shaft 22 is rotatably mounted in bearings 24, 26 and 28, through mounting flanges 30, 32 and 34 respectively, which are perpendicularly attached to mounting plate 36. A coil spring 38 surrounds the upper end of shaft 22, the inner end of the spring passing through a slot in the shaft and being securely located therein. The outer end of spring 38 is formed into a hook 39 and is hooked through top cover 40. Thus spool 20 will be biased to the relaxed position of spring 38.

Figure 1:
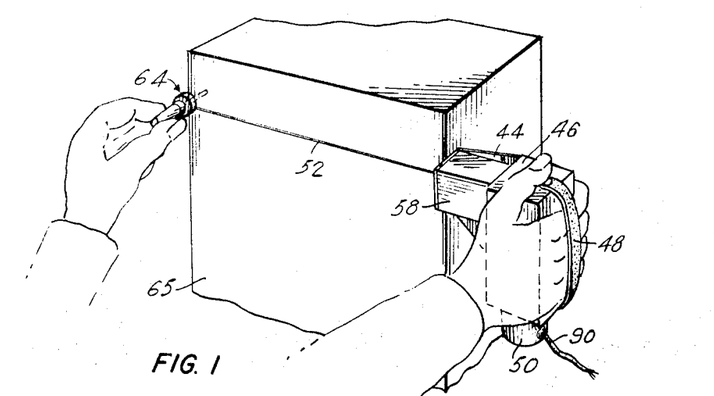
FIG. 1 is a perspective view, to an enlarged scale, of the apparatus in hand-held form and shown in use.
Figure 2:
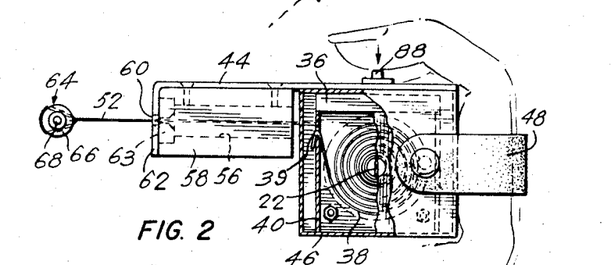
FIG. 2 is a plan view, partly in section, of the apparatus in FIG. 1.

A rotary potentiometer 42 is mounted downwardly on mounting flange 34 and the input shaft thereof is attached to shaft 22 and adapted to rotate therewith. Mounting plate 36 is attached to support member 44 and a cover 46 encloses the entire assembly and is also attached to support member 44. A strap 48 is provided for hand-held convenience as shown in FIGS. 1 and 2. A cover 50 encloses the potentiometer 42.

A length of measuring line 52 is wound around spool 20 in side-by-side coils and extends through a slot 54 in cover 46, through bore 56 in guide block 58, and through hole 60 in flange 62 of support member 44. Guide block 56 is preferably of plastic material, such as "Plexiglas." A bushing 63 of "Teflon," or similar material, is provided in the end of guide block 56 for accurate guidance of line 52. Line 52 is preferably of steel stranded nylon fishing type line, but other lines having the characteristics of flexibility together with nonstretchability, will be equally operative.

It will be understood that the positioning of potentiometer 42 is a matter of design convenience and that other arrangements may equally well be used and fall within the scope of this invention, i.e., the potentiometer may be positioned on the same axis as the spool shaft axially parallel with the spool shaft, at an angle to the spool shaft, etc.

A probe assembly 64 is attached to the end of line 52 for convenience in accurately locating the corners of the package 65 being measured, as shown in FIG. 1. Probe assembly 64 includes ring 66 to which line 52 is securely attached, and probe member 68 which is rotatable within ring 66.

Figures 3, 4:
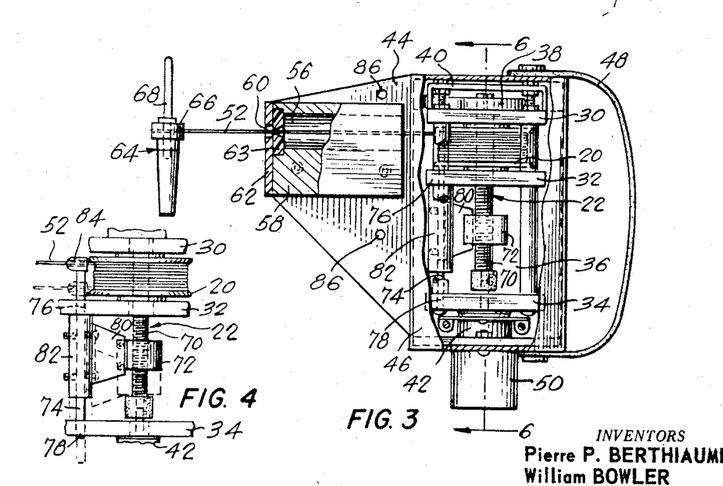
FIG. 3 is a side view, partly in section, of the apparatus in FIG. 1.
FIG. 4 is a detail of the basic components shown in FIG. 3.
Figure 5:
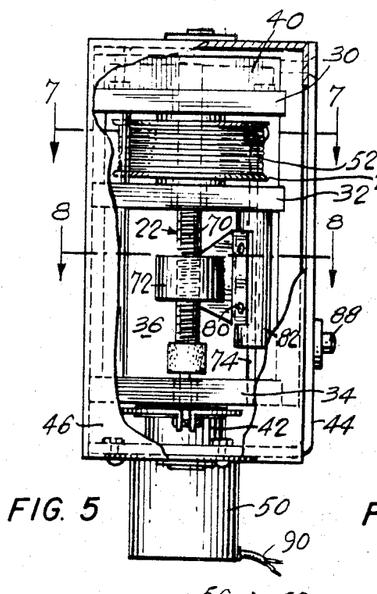
FIG. 5 is an end view to a further enlarged scale, and partly in section, of the apparatus in FIG. 1.
Figure 6:
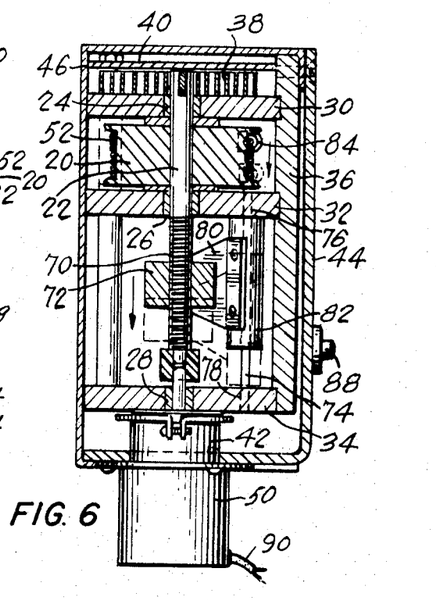
FIG. 6 is an end view, similar to FIG. 5, but shown in section.
Figure 7:
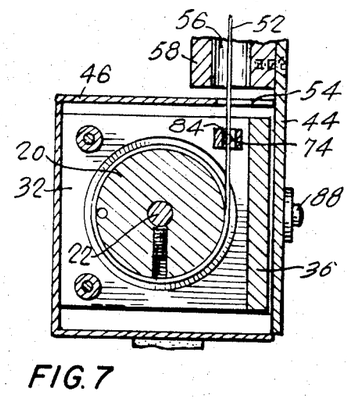
FIG. 7 is a section on 7—7 in FIG. 5.
Figure 8:
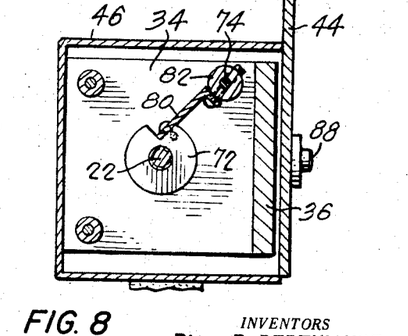
FIG. 8 is a section on 8—8 in FIG. 5.

FIG. 4 shows details of an arrangement for ensuring that line 52 is always wound onto spool 20 in level side-by-side coils. This is achieved by the provision of screw thread 70 on shaft 22, upon which threaded nut 72 is operatively positioned. Guide rod 74 is slideably positioned in holes 76 and 78 in mounting brackets 32 and 34, respectively, and is rigidly attached to nut 72 by means of bracket 80 and clamping sleeve 82, which causes guide rod 74, through nut 72, to move upwardly or downwardly, according to the direction of rotation. The upper portion of guide rod 74 is provided with a lug having a guide hole 84 therethrough. The pitch of thread 70 on shaft 22 is matched to the pitch of the coils on spool 20 and thus one rotation of shaft 22 will move guide rod 74 a distance corresponding to one coil on spool 20, and line 52, which passes through guide hole 84, will be properly wound onto the spool without any overlapping, or wide spacing, of the coils. FIG. 4 illustrates, in full lines, guide rod 74 in the upper position, and in broken lines, guide rod 74 in the lower position.

Full extension of line 52 is adapted to provide maximum rotation of potentiometer 42, for example, a 50 inch line may be equal to 10 turns on the potentiometer.

Thus the electrical output from potentiometer 42 will be directly proportional to the extension of line 52, which will be equal to the particular package dimension measured.

Holes 86 may be positioned through support member 44 to enable the device to be screwed to a table, and for packages to be placed on the table with one corner adjacent the device, to enable the probe to be extended across the three package dimensions required for the cubic computation thereof.

Button 88 is provided on the casing and is electrically connected, when pressed, to initiate the storing of the electrical output from potentiometer 42 which corresponds to the measured dimensions. It will be understood that the position of button 88 is a matter of convenience.

As previously mentioned, each electrical output from potentiometer 42 is individually stored in a capacitor and the three output voltages therefrom are connected in series for the addition thereof when a natural logarithmic potentiometer is used, or into a potentiometer scaling circuit when a linear potentiometer is used. The electrical outputs from potentiometer 42 are fed to the computing apparatus via electrical cable 90.

Figure 9:
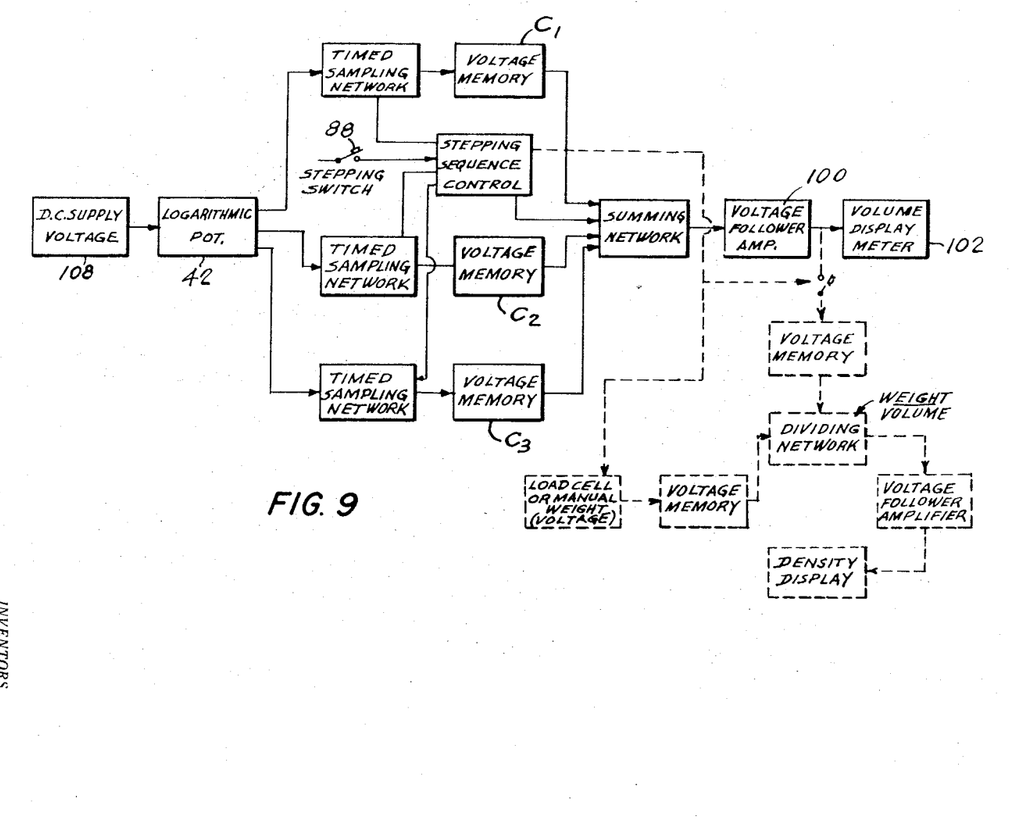
FIG. 9 is a block diagram of the components for computing volume using a natural logarithmic potentiometer.

FIG. 9 is a block diagram, in full lines, of the components for computing volume from three voltage outputs from a natural log potentiometer.

An example of such a natural log potentiometer is 1″ diameter x 1 9/16″, 10 turns, 5 kilohms resistance range, 2.5 watts, and with servo mount.

Figure 10:
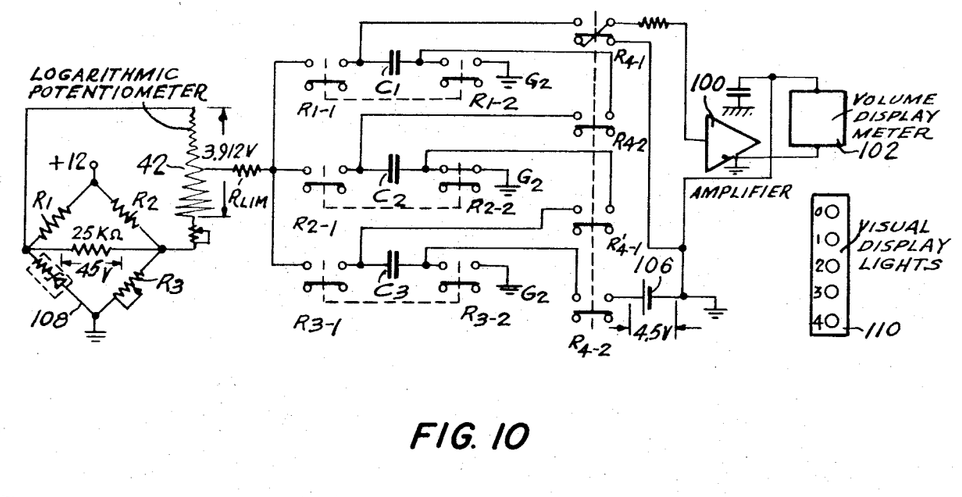
FIG. 10 is a circuit diagram of the computing components shown in FIG. 9, and showing the series connected capacitor method of summing the voltages.
Figure 11:
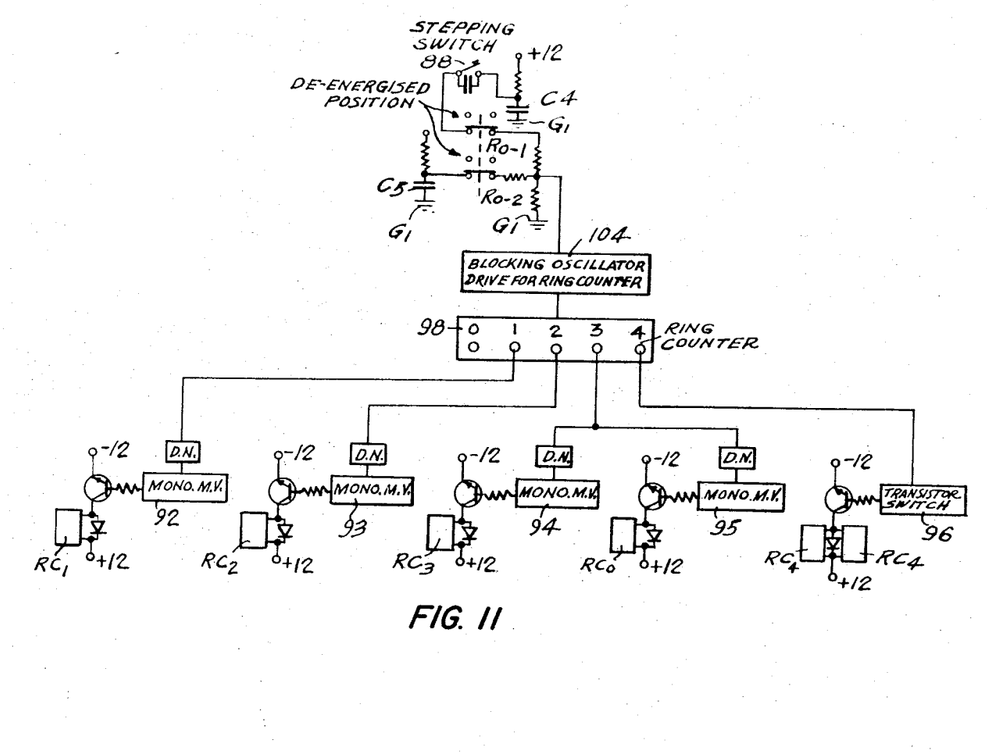
FIG. 11 is a circuit diagram of the control elements for the components in FIG. 10.

The following is a description of the operation of the volume measuring device referring to FIGS. 9 to 11. The components include 4 monostable multivibrators 92, 93, 94, and 95; a transistor switch 96; a 5-stage ring counter 98; a natural logarithmic potentiometer 42; 5 capacitors $C_1$, $C_2$, $C_3$, $C_4$, $C_5$; 6 mercury relays $R_0$, $R_1$, $R_2$, $R_3$, $R_4$, $R_5$; and amplifier 100 and a display meter 102 with an antilog scale.

When a measurement is to be taken the line 52 is extended along one dimension of the package. This rotates the potentiometer so that the voltage output therefrom is the logarithm of the dimension (in inches). Referring specifically to FIG. 11, as the stepping switch or button 88 is pressed, capacitor $C_4$ discharges, giving an electrical pulse to blocking oscillator drive 104, which emits a precisely shaped pulse which advances ring counter 96 from position No. 0 to position No. 1. This triggers multivibrator 92 which is connected to the coil of relay $R_1$ and whose function is to turn on relay $R_1$ for a fixed time (approximately 1/10 of a second). When contacts $R_{1-1}$, $R_{1-2}$ of relay $R_1$ are closed capacitor $C_1$ is charged to a voltage proportional to the first dimension and retains this voltage charge after the contacts open. This process is repeated twice more to allow capacitors $C_2$ and $C_3$ to charge to voltages proportional to the other two dimensions of the package.

When relay $R_3$ is energized to allow capacitor $C_3$ to charge, relay $R_0$ is also energized simultaneously. Multivibrator 95, which controls the time that relay $R_0$ is energized, is set to permit relay $R_0$ to remain energized for a period longer than relay $R_3$. The purpose of energizing relay $R_0$ is twofold. As can be seen from FIG. 11, contacts $R_{0-1}$ are in series with switch 88, while contacts $R_{0-2}$ prevent capacitor $C_5$ from charging. Therefore, when relay $R_0$ is energized (the contacts are then opened), the effect of switch 88 is nullified and capacitor $C_5$ is charged. When relay $R_0$ is de-energized (closed contacts) capacitor $C_5$ will discharge and provide a pulse to blocking oscillator 104 which then advances the ring counter to position No. 4, which is the volume display position.

In position No. 4, both relays $R_4$ and $R_4'$ are energized, connecting the capacitors $C_1$, $C_2$, $C_3$ in series and effectively adding the voltages stored therein. Since the natural logarithm of 50 inches is approximately 3.9 volts, three such maximum dimensions would give a maximum output of approximately 11.7 volts. The lowest volume which would be of interest may be arbitrarily set, for example at 0.05 ft.$^3$ which corresponds to a voltage of approximately 4.5 volts. Thus, in order to utilize scale space of display meter 102 to the best advantage, a "back-off" voltage of 4.5 volts is introduced in series with capacitors $C_1$, $C_2$, and $C_3$, so that the maximum output would be approximately 7.2 volts, and not 11.7. This back-off voltage is shown schematically in FIG. 10 as battery 106.

These voltages are applied to an emitter follower amplifier 100, which has a high input impedance, and thus keeps the capacitors from discharging appreciably and the output on meter 102 constant.

A voltage of 3.912 volts is obtained for the voltage input from a temperature compensated Zener bridge 108 as, in actual practice, is the 4.5 volt "back-off" voltage. Visual display lights 110 indicate the position of the ring counter.

The following is a sample volume measurement:
Three dimensions of package to be measured $$l_1 = 3'9'' = 45''$$
$$l_2 = 1'8'' = 20''$$
$$l_3 = 0'6'' = 6''$$

Capacitors $C_1$, $C_2$, and $C_3$ will be charged to ln 45 or 3.81 volts
ln 20 or 3.00 volts
ln 6 or 1.79 volts Thus 8.60 volts is the total of the 3 voltages on the capacitors and is also numerically equal to the sum of the natural logarithms of the 3 dimensions; or 8.60=ln (45×20×6).

Subtracting ln (1728 in.$^3$/ft.$^3$)=7.46, and taking the antilog of 1.14 (i.e., 8.60—7.46) gives an answer of 3.13 ft.$^3$.

If an ammeter is converted to a 7 volt voltmeter the meter would theoretically read 8.60 volts if a 4.50 volt back-off voltage were not used. The meter face is calibrated to show 3.13 ft.$^3$ at a voltage of 8.60—4.50 or 4.10 volts.

The back-off voltage is arbitrarily chosen as 4.50 or approximately ln (90 in.$^3$ or 0.05 ft.$^3$) which is about the lowest volume of interest. This also allows a wider spacing of volume markings on the meter face.

FIG. 9 also indicates, a broken line, the additional components and circuitry required for obtaining the output reading as a density.

With the volume being readily available in cubic feet from the display meter 102, the apparent density of a package may be easily obtained from the relationship:

$$\frac{\text{Weight of package}}{\text{Rectangular volume}} = \frac{\text{lbs.}}{\text{cu. ft.}}$$

The weighing of the packages may be executed on manual operated lever scales, or the process may be automated by utilizing a conveyer system which rests upon load cells (i.e., the weight of the package is obtained whilst in motion, thus saving time).

Figure 12:
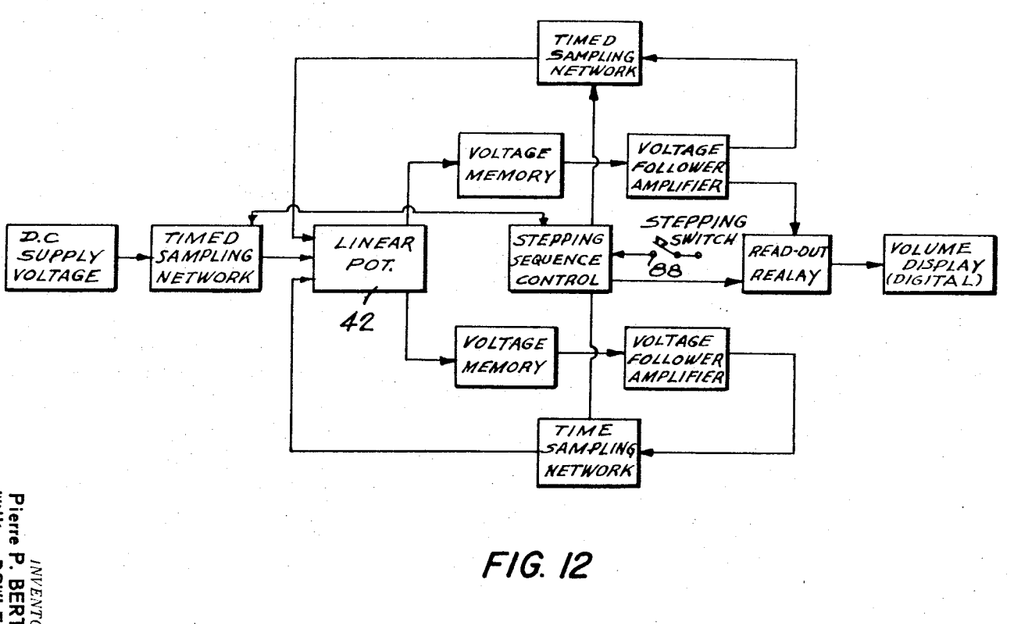
FIG. 12 is a block diagram of the components for computing volume using a linear potentiometer.

FIG. 12 is a block diagram of the components for computing volume from three voltage outputs from a linear potentiometer.

An example of such a linear potentiometer is in 1" diameter x 1 9/16, 10 turns, 5 kilohms resistance range, 2.5 watts, ±0.20 linearity, and with servo mount.

Figure 13:
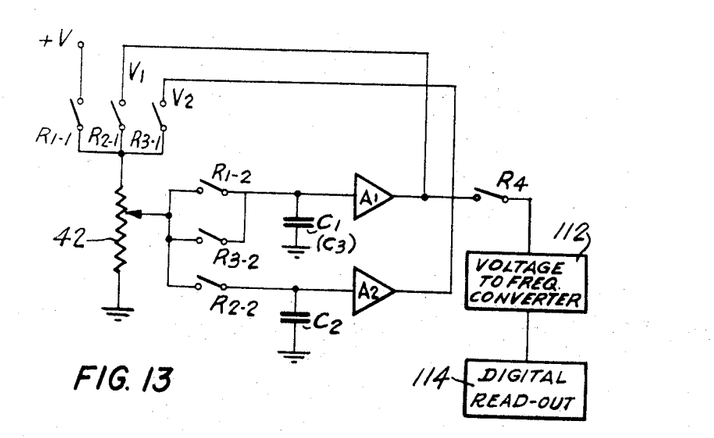
FIG. 13 is a circuit diagram of the computing components shown in FIG. 12.

FIG. 13 is a circuit diagram of the computing components shown in FIG. 12. The remaining control components in block diagram 12 are shown basically in FIG. 11. For example, step switch or button 88 will again advance ring counter 98, through similar circuitry, ring counter 98 triggering three monostable multivibrators which control the energizing and deenergizing of relays $R_1$, $R_2$, and $R_3$ in FIG. 13.

The description of operation of the components in FIGS. 12 and 13 is as follows, wherein the circuitry in FIGS. 13 is broken down into FIGS. 14, 15 and 16, which illustrate the active components used in registering the three separate measurements. It will be noted that the combination of FIGS. 14, 15 and 16 is identical to the complete circuit shown in FIG. 13.

The operation is as follows:

Line 52 is extended along one dimension of the package. This rotates the potentiometer so that the voltage output therefrom is proportional to the dimension. Stepping switch or button 88 is pressed and ring counter 98 is advanced from position No. 0 to position No. 1 and a multivibrator energizes relay $R_1$.

Figures 14, 15, 16:
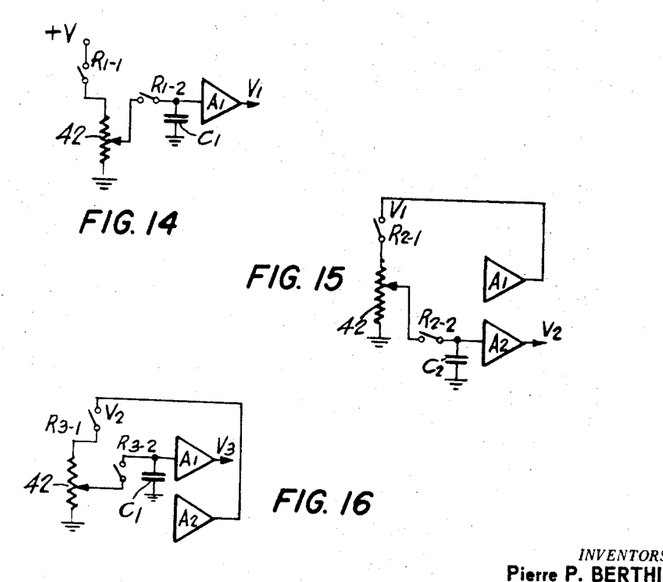
FIG. 14 is a circuit diagram of the active components of FIG. 13, used in registering the first measurement.
FIG. 15 is a circuit diagram of the active components of FIG. 13, used in registering the second measurement.
FIG. 16 is a circuit diagram of the active components of FIG. 13, used in registering the third measurement.

Referring now to FIG. 14, let $l_1$, $l_2$ and $l_3$ be the dimensions of the package, and let L be the maximum dimension which can be obtained (this depends on the spool diameter, potentiometer turns, etc.).

When relay $R_1$ is energized a voltage V will be applied to the terminals of linear potentiometer 42 and the output $v_1$ therefrom will be proportional to the dimension $l_1$, thus:

$$v_1 = \frac{l_1}{L}V$$

This output will be "sampled" for a fraction of a second allowing capacitor $C_1$ to charge. The voltage $v_1$ on capacitor $C_1$ is fed into a high impedance unity gain amplifier $A_1$ whose output is then used as a supply voltage and applied again to potentiometer 42.

Referring to FIG. 15, when button 88 is pressed to indicate measurement of second dimension $l_2$, ring counter 98 will be advanced to position No. 2 and another multivibrator will be triggered. This will energize relay $R_2$ and capacitor $C_2$ will then be charged to a voltage $v_2$, which is proportional to the second dimension $l_2$, thus:

$$v_2 = \frac{l_2}{L}v_1$$

This voltage $v_2$ on capacitor $C_2$ is fed into a high impedance unity gain amplifier $A_2$ whose output is then used as a supply voltage and applied once again to potentiometer 42.

Referring to FIG. 15, when button 88 is pressed to indicate measurement of the third dimension $l_3$, ring counter 98 will be advanced to a position No. 2 and a further multivibrator will be triggered. This will energize relay $R_3$ and capacitor $C_1$ will be recharged to a voltage $v_3$, which is proportional to the third dimension $l_3$, thus:

$$v_3 = \frac{l_3}{L}v_2$$
$$= \frac{l_3}{L} \times \frac{l_2}{L}v_1$$
$$= \frac{l_3}{L} \times \frac{l_2}{L} \times \frac{l_1}{L}V$$
$$v_3 = \frac{l_3 l_2 l_1}{L^3}$$

If the voltage V is equal to magnitude to the cube of the maximum dimension capability L of the potentiometer, then $v_3$ will be equal to the volume of the package, e.g., $l_3 \times l_2 \times l_1$. It should be noted that V can be any voltage provided appropriate scaling is used in the voltage to frequency converter.

As for the previously mentioned natural logarithmic potentiometer execution, the pressing of button 88 for the third dimension will also energize a further relay which will result in ring counter 98 being advanced to position No. 4 which is the volume display position.

Referring again to FIG. 13, advancement of the ring counter to position No. 4 will energize relay $R_4$ and the amplifier $A_1$ is then used to drive a voltage to frequency converter 112, which provides electrical pulses for an electronic counter 114 to display the output as a volume in digital form, or the output from amplifier $A_1$ may be displayed on a suitable meter.

A numerical example of this execution follows:

Consider a package whose dimensions are 3 ft. x 2 ft. x 1 ft. The applied voltage $V$=64 volts.

To find the package volume in cubic feet let:

$$v_1 = \frac{l_1}{L}V = \frac{3}{4} \times 64 = 48 \text{ volts}$$

$$v_2 = \frac{2}{4} \times 48 = 24 \text{ volts}$$

$$v_3 = \frac{1}{4} \times 24 = 6 \text{ volts}$$

Voltage to frequency converter 112 will now produce say 100 pulses per volt, or 600 pulses for 6 volts. Electronic counter 114 will count 600 pulses and the decimal point can be placed so as to read 6.00 ft.$^3$ $$\therefore \text{volume} = 3' \times 2' \times 1' = 6 \text{ ft.}^3$$

It will be understood that this execution may also be adapted to provide an output of package density, in a manner similar to that described for the natural logarithmic execution.

It will be further understood that the two executions for converting three electrical outputs from the potentiometers into a volumetric or density output, are but two conveniently operative executions, and that other means can equally well be embodied in this invention without departing from the scope thereof.

What we claim is:

1. A device for measuring the volume of packages including a mounted bracket, a shaft rotatably mounted on said bracket, a spool mounted on said shaft to rotate therewith, a length of measuring line wound around said spool and adapted to be extended outwardly therefrom across the width, height, or depth of said package, spring means for returning said spool to a first position with said line substantially wound around said spool, a rotary electrical potentiometer mounted on said bracket and having the input shaft thereof operatively connected to be rotated by said first mentioned shaft in accordance with the extension of said line, a voltage supply connected to said potentiometer such that said potentiometer will emit a voltage output proportional to the rotation applied thereto by said first mentioned shaft, electrical circuit means connected to said potentiometer for converting three separate electrical outputs from said potentiometer into a volume reading, and switch means for applying said three separate electrical outputs into said converting means.

2. A device as set forth in claim 1 including means for winding said line onto said spool in side-by-side coils.

3. A device as set forth in claim 2 in which said means comprises a spiral groove in said spool surface.

4. A device as set forth in claim 2 including a screw thread on said first mentioned shaft, nut means operatively mounted on said shaft and adapted to move upwardly or downwardly when said shaft is rotated, and guide means connected to said nut means and extending adjacent said spool said line passing through said guide means, the pitch of said thread being equal to the pitch of the aligned coils on said spool.

5. A device as set forth in claim 1 including weighing means interconnected with said converting means and adapted to provide an output indicating the density of said package.

6. A device as set forth in claim 1 in which said rotary potentiometer is a natural logarithmic potentiometer.

7. A device as set forth in claim 1 in which said rotary potentiometer is a linear potentiometer.

8. A device as set forth in claim 6 in which said converting means includes capacitor means for separately storing said separate potentiometer electrical outputs, relay means for series connecting said capacitor means for effectively adding the voltages stored therein, amplifier means connected to the output from said series connected capacitor means, read-out means connected to said amplifier means and displaying the antilog of the amplifier output as a volume measurement, and stepping sequence control means for separately charging said capacitor means in response to signals from said switch means.

9. A device as set forth in claim 7 in which said converting means includes a plurality of capacitors for separately storing said separate potentiometer electrical outputs, relay means for consecutively interconnecting said capacitors such that the voltage output from one capacitor is applied as the voltage input to the next capacitor to effect an overall multiplication thereof, read-out means connected to receive said multiplied output and to display a volume reading proportional to said multiplied output, and stepping sequence control means for separately charging said capacitors in response to signals from said switch means.

10. A device as set forth in claim 8 including weighing means adapted to weigh said package, a dividing network adapted to divide the output from said weighing means by the output from said amplifier means and read-out means connected to said dividing network to display the output therefrom as the density of said package.

No references cited.

RICHARD C. QUEISSER, *Primary Examiner.*

J. K. LUNSFORD, *Assistant Examiner.*